US012655704B1

(12) United States Patent
Al-Qasim et al.

(10) Patent No.: US 12,655,704 B1
(45) Date of Patent: Jun. 16, 2026

(54) ENHANCED HYDROGEN GENERATION FROM SONICATION OF SI+ MIXTURES FOR ARTIFICIAL LIFT

(71) Applicant: SAUDI ARABIAN OIL COMPANY, Dhahran (SA)

(72) Inventors: Abdulaziz S. Al-Qasim, Dammam (SA); Danna A. Khattab, Dhahran (SA); Pramod Patil, Sugar Land, TX (US); Ali A. Yousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/222,060

(22) Filed: May 29, 2025

(51) Int. Cl.
 *E21B 28/00* (2006.01)
 *C01B 3/02* (2026.01)

(52) U.S. Cl.
 CPC .............. *E21B 28/00* (2013.01); *C01B 3/02* (2013.01)

(58) Field of Classification Search
 CPC ........ E21B 28/00; E21B 43/16; E21B 43/162; E21B 43/164; E21B 43/166; E21B 43/168; E21B 43/255; C01B 3/02
 See application file for complete search history.

(56) References Cited

U.S. PATENT DOCUMENTS 5,824,214 A * 10/1998 Paul ....................... C10G 45/24
 166/371
7,534,275 B2 5/2009 Tonca 2006/0213662 A1 * 9/2006 Creel ...................... E21B 27/02
 166/292
2019/0234162 A1 * 8/2019 Barker .................... E21B 21/08
2020/0003036 A1 * 1/2020 Bunio ..................... E21B 43/26
2022/0065818 A1 * 3/2022 Werkheiser ........ G01N 15/0806
2022/0145162 A1 * 5/2022 Tomson ................. C09K 8/035

FOREIGN PATENT DOCUMENTS

CN 100369666 C 2/2008
JP H11171501 A 6/1999
WO 2007018244 A1 2/2007
WO 2009034479 A2 3/2009
(Continued)

OTHER PUBLICATIONS

P. Domenighini, et al., "Future perspectives in green hydrogen production by catalyzed sono-photolysis of water," Sustainable Energy and Fuels, 2024 (14 pages).
(Continued)

*Primary Examiner* — Kristyn A Hall
(74) *Attorney, Agent, or Firm* — Osha Bergman Watanabe & Burton LLP

(57) ABSTRACT

Systems and methods for generating hydrogen are provided. The system includes a silica generator configured to generate an injection fluid comprising silica particles, an injection apparatus configured to inject the silica injection fluid into a target zone of an injection well, and a sonicator configured to transmit sound waves to the target zone of the injection well. The method includes generating an injection fluid comprising silica particles, injecting the injection fluid into the target zone of the injection well, and sonicating the target zone of the injection well, thereby generating hydrogen.

16 Claims, 13 Drawing Sheets

(56)                    References Cited

FOREIGN PATENT DOCUMENTS

| WO | WO 2023/192219 | * | 10/2023 |
| WO | 2023205838 A1 | | 11/2023 |

OTHER PUBLICATIONS

S. H. Zadeh, "Hydrogen Production via Ultrasound-Aided Alkaline Water Electrolysis," Journal of Automation and Control Engineering, 2014 (7 pages).

I. S. Curtis, et al., "Photocatalytic hydrogen generation using mesoporous silicon nanoparticles: influence of magnesiothermic reduction conditions and nanoparticle aging on the catalytic activity," Nanoscale, 2021 (8 pages).

F. Erogbogbo, et al., "On-Demand Hydrogen Generation using Nanosilicon: Splitting Water without Light, Heat, or Electricity," Nano Letters, 2012 (6 pages).

"Efficient Hydrogen Production with Ultrasonics," Hielscher Ultrasonics, retrieved May 28, 2025 from URL <https://www.hielscher.com/efficient-hydrogen-production-with-ultrasonics.htm> (7 pages).

M. S. Hossain, et al., "In Situ Process Monitoring for Additive Manufacturing Through Acoustic Techniques," ASM International, 2020 (14 pages).

"Infrasound," Wikipedia, retrieved May 28, 2025 from URL <https://en.wikipedia.org/wiki/Infrasound> (14 pages).

M. E.A. Mohammed, et al., "Importance and Applications of Ultrasonic Technology to Improve Food Quality," Food Processing, 2019 (16 pages).

S. S. Rashwan, et al., "The Sono-Hydro-Gen process (Ultrasound induced hydrogen production): Challenges and opportunities," International Journal of Hydrogen Energy, 2019 (27 pages).

Y. Wang, et al., "Hydrogen Bonds Enhanced Composite Polymer Electrolyte for High-Voltage Cathode of Solid-State Lithium Battery," U. S. Department of Energy Office of Scientific and Technical Information, 2022 (34 pages).

* cited by examiner

100

| Generating a charged silica injection fluid using a charged silica generator | 502 |

| Injecting the charged silica injection fluid into a target zone of an injection well using an injection apparatus | 504 |

| Sonicating the target zone of the injection well using a sonicator, thereby generating hydrogen | 506 |

ENHANCED HYDROGEN GENERATION FROM SONICATION OF SI+ MIXTURES FOR ARTIFICIAL LIFT

BACKGROUND

In the field of oil and gas, artificial lift systems are used to increase fluid flow from a production well. Artificial lift systems work by increasing the pressure within the reservoir of a well, generally utilizing either pumps or gas lift. This pressure is known as the bottom-hold pressure (BHP), and it must exceed a certain threshold for fluid to flow to the surface of a well. The threshold typically increases with well depth and fluid density. Artificial lift systems are often employed in depleted reservoirs which tend to have low BHP. However, artificial lift systems are also used in many naturally flowing wells, as a higher BHP can increase productivity.

For wellbores with more challenging reservoir conditions, such as water saturation and heavy oil, artificial lift systems are utilized with enhanced oil recovery systems. An enhanced oil recovery system, such as gas injection, may be performed to increase oil mobility in the well, then an artificial lift system, such as an electric submersible pump, may be used to lift the oil to the surface of the well. Artificial lift systems that include capabilities of enhanced oil recovery systems would enhance the technology available for increasing production from challenging reservoirs.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for hydrogen generation in an injection well. The system comprises a silica generator, an injection apparatus in fluid communication with the silica generator, and a sonicator. The silica generator is configured to generate an injection fluid comprising silica particles, the injection apparatus is configured to inject the silica injection fluid into a target zone of the injection well, and the sonicator is configured to transmit sound waves to the target zone of the injection well.

In another aspect, embodiments disclosed herein relate to a method for generating hydrogen in an injection well. The method comprises generating an injection fluid comprising silica particles, injecting the injection fluid into a target zone of an injection well, and sonicating the target zone of the injection well. In one aspect, embodiments disclosed herein relate to the method further comprising recovering hydrocarbons from a production well.

Other aspects and advantages of the claimed subject matter will be apparent from the following description and the appended claims.

DETAILED DESCRIPTION

Figure 1A:
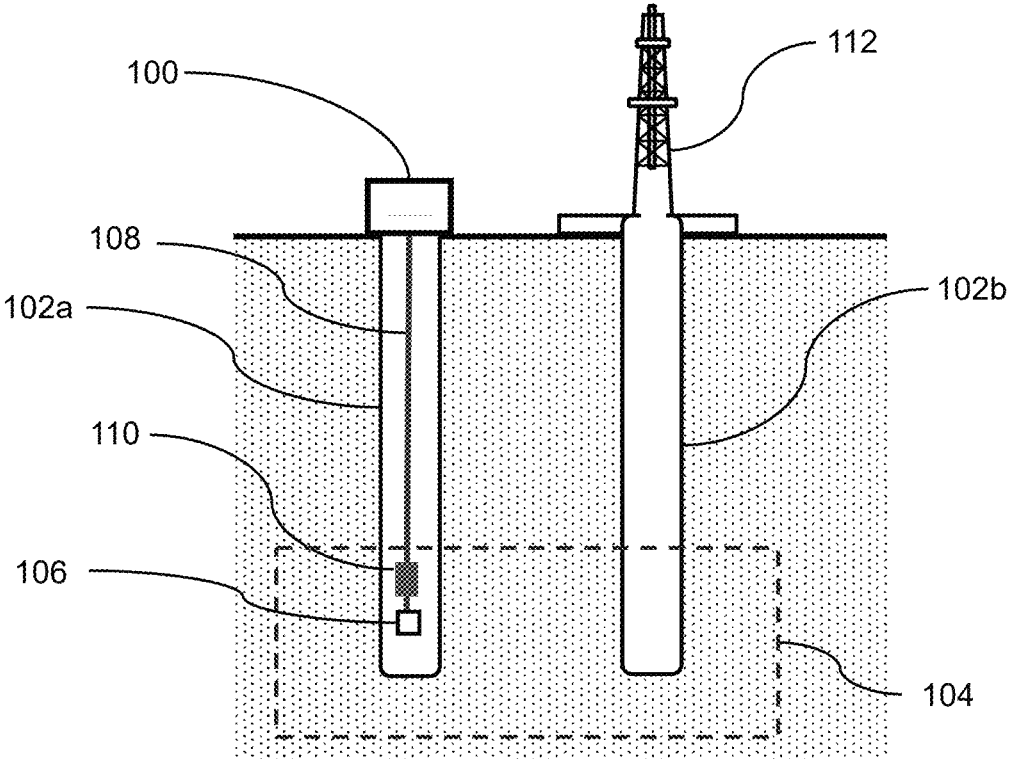
FIGS. 1A-1D are schematic diagrams of systems for artificial lift according to one or more embodiments.

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In one aspect, embodiments disclosed herein relate to systems and methods for producing artificial lift in a well using generating hydrogen. Hydrogen may be generated by reacting water and silica. The silica catalyzes water splitting. The silica may have a particular surface charge or functionalization to enhance hydrogen generation. The reaction may be accelerated through sonication. When the reaction is performed within a wellbore, the generated hydrogen may increase the pressure in localized zones within the wellbore. The localized pressure increases created by hydrogen generation may mobilize oil within the wellbore and displace trapped gas. This effect is particularly advantageous in well reservoirs with low bottom-hole pressure (BHP), such as depleted wellbores.

In addition to artificial lift application, hydrogen generation may be advantageous for enhanced oil recovery. In well reservoirs with water saturation, for example, oil and gas may be trapped due to water blockages rather than low BHP. Silica may be injected into a water-saturated zone and react directly with the formation water. As the silica breaks down the formation water, it generates hydrogen and clears the blockages. A path may emerge for oil and gas to rise to the surface, and the oil and gas may be further mobilized by increases in localized pressure.

Hydrogen generation may also be useful for enhanced oil recovery in reservoirs with heavy oil and tar. In these reservoirs, the oil viscosity prevents oil mobilization. As the silica reacts with water and releases hydrogen, the hydrogen emulsifies the heavy oil. The resulting decrease in oil viscosity increases the mobility of the oil.

Figure 1B:
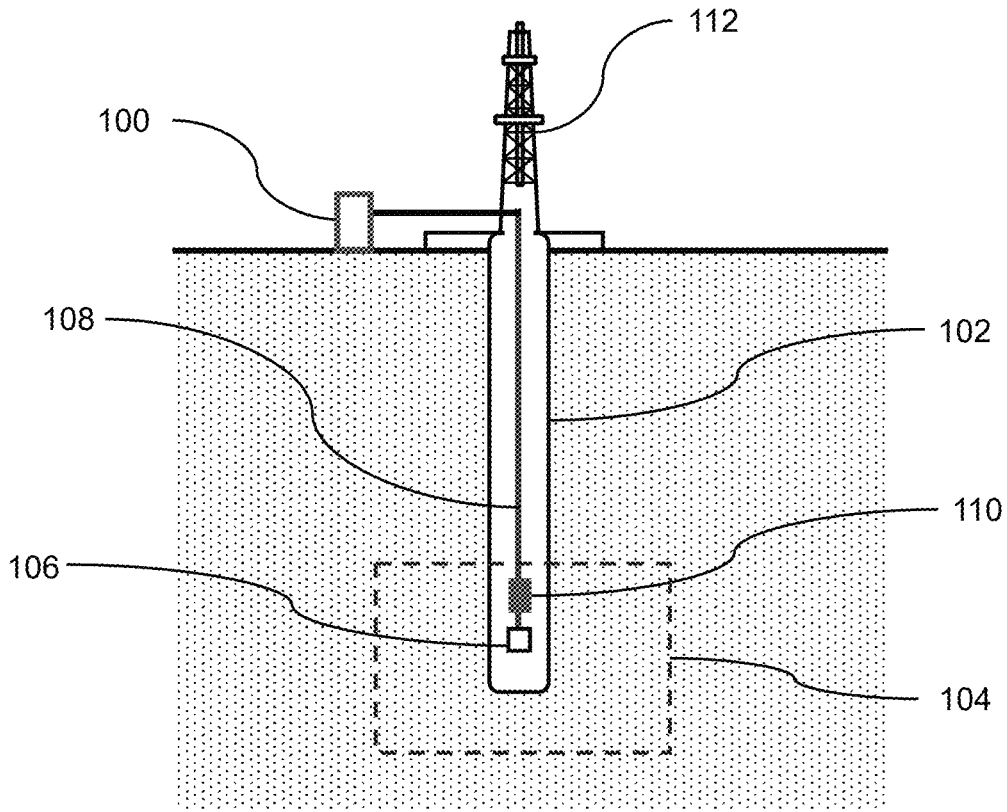
Figure 1C:
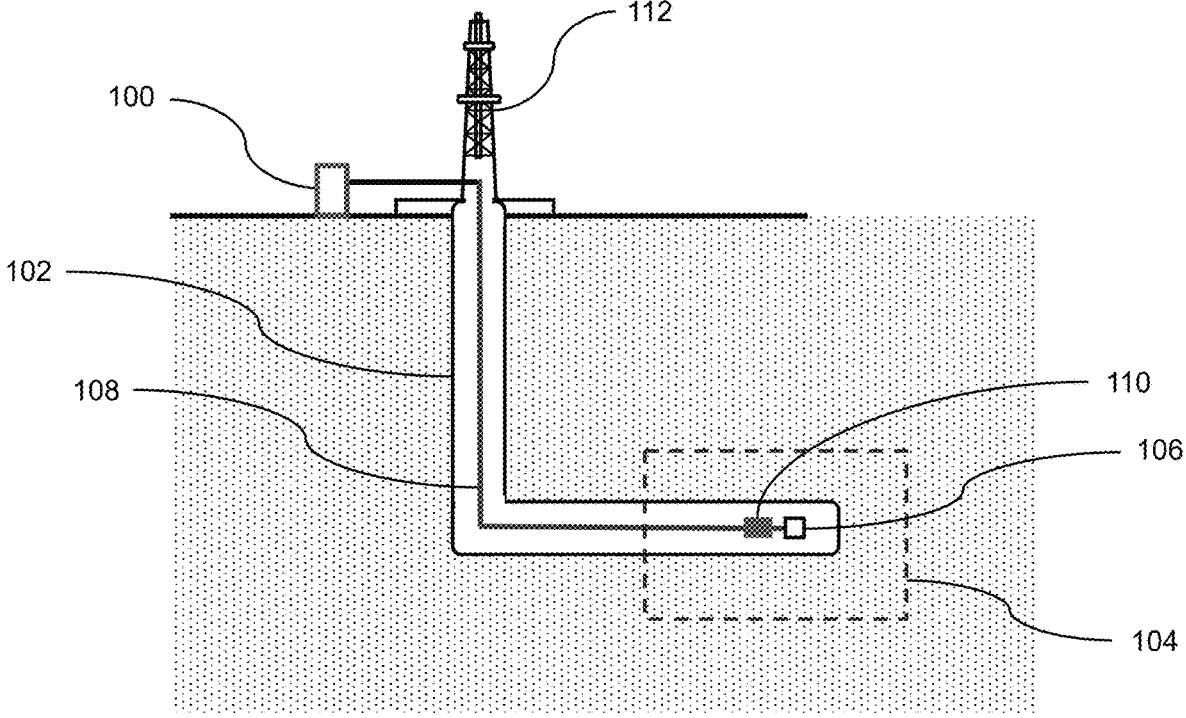
Figure 1D:
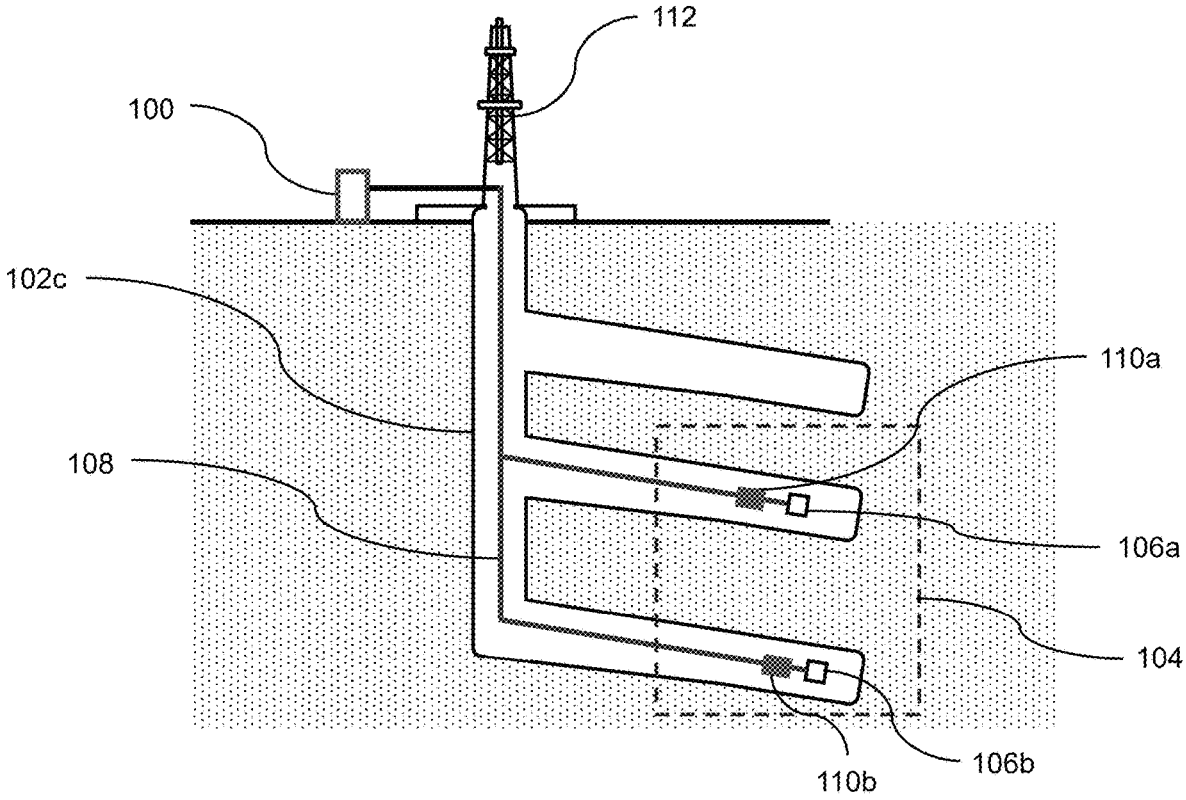

FIGS. 1A-1D show systems for artificial lift in accordance with one or more embodiments. The systems in FIGS. 1A-1D depict illustrative examples of how a silica generator (100) according to embodiments of the present disclosure may be used with a wellbore comprising hydrocarbons. The wellbore may be one or more wellbores used in the oil and gas industry. The system may include an injection well (102a) together with a production well (102b), as shown in FIG. 1A, a single injection and production well (102), as shown in FIGS. 1B-1D, or combinations of multiple injection wells and/or production wells. The wellbore may be vertical, horizontal, multilateral, or combinations thereof, and may be located onshore or offshore. In accordance with one or more embodiments, a vertical wellbore is shown in FIGS. 1A and 1B, a horizontal wellbore is shown in FIG. 1C, and a multilateral wellbore is shown in FIG. 1D.

In the present disclosure, a target zone (104) of a well refers to a portion of the well reservoir in which hydrogen generation is desired. For example, the target zone may be a region of a wellbore in which artificial lift and/or enhanced oil recovery is needed to mobilize hydrocarbons. The target zone (104) may include the entirety of or a portion of an injection well (102a) and a production well (102b). The target zone (104) may extend into the reservoir surrounding the well. The target zone (104) may be static or dynamic during hydrocarbon recovery.

In one or more embodiments, the silica generator (100) may be configured to generate silica at a wellbore site. In one or more embodiments, the silica generator (100) may create silica nanoparticles. In addition to controlling the particle size, the silica generator (100) may control the surface properties of the silica.

The silica generator (100) may be fluidly connected to an injection apparatus (106) via a conduit (108). The injection apparatus (106) may be configured to inject a silica-containing fluid into a target zone (104). The injection apparatus (106) may be inserted into a wellbore or may remain above ground.

In one or more embodiments, a sonicator (110) may be used in combination with the injection apparatus (106). The sonicator (110) may, for example, be integrated into the injection apparatus (106). The sonicator (110) may be configured to transmit sound waves to the target zone (104). The sonicator (110) may be an acoustic wave generator, an ultrasonic wave generator, and/or an infrasonic wave generator.

The sonicator (110) may be lowered into a wellbore using a wireline, production tubing, or another well intervention method. For example, the sonicator (110) may be attached to the conduit (108) for insertion into a wellbore. The method of insertion may be selected based on the wellbore configuration and the design of the sonicator.

The sonicator (110) may be electrically connected to above-ground devices via a wired connection. In one or more embodiments, the conduit (108) may include a wireline (116) or other type of cable. Alternatively, the sonicator (110) may be controlled via wireless communication. In a wireless system, the sonicator may communicate with surface devices such as a computer, processing unit, or other controller. Wireless communication methods may include, for example, the use of radio frequency (RF) signals.

The sonicator (110) may be located in the well or above the surface of the well, provided that the sonicator (110) can deliver sound waves to the target zone (104) of the wellbore. In some embodiments, the sonicator (110) may include one or more sonication transducers, e.g., ultrasonic transducer, in the well. One or more sonication transducers may be located in the target zone (104), or sonication transducers may be placed at different depths in the well to deliver sound waves to multiple target zones. The sonicator (110) may also include a sonication generator placed on the surface to generate the sound waves which are then transmitted down the wellbore through a sonication transducer.

FIG. 1A depicts a system for artificial lift that includes two wellbores. The first wellbore is an injection well (102a). A silica generator (100) is shown above the injection well (102a), and a conduit (108), sonicator (110), and injection apparatus (106) are shown in the injection well (102a). The second wellbore is a production well (102b). An oil production facility (112) is shown above the production well (102b). A target zone (104) is shown including a portion of both wellbores.

FIGS. 1B and 1C depict systems for artificial lift that include one wellbore. FIG. 1B shows a vertical wellbore and FIG. 1C shows a horizontal wellbore, both of which include a combination well (102) that functions as both an injection well and a production well. A silica generator (100) is shown next to an oil production facility (112), and the silica generator is shown connected to a sonicator (110) and injection apparatus (106) via a conduit (108). A target zone (104) is shown including a portion of combination well (102).

FIG. 1D depicts a system for artificial lift that includes a multilateral wellbore. The multilateral wellbore is a multilateral well (102c), which includes a single main bore that functions as a combination well (102). Several horizontal wellbores are shown branching off the single main bore of the multilateral well (102c). A silica generator (100) is shown next to an oil production facility (112), and the silica generator is shown connected to two sonicators (110a and 110b) and two injection apparatuses (106a and 106b) via a conduit (108). One sonicator (110a) and one injection apparatus (106a) are shown in one of the horizontal branches of the multilateral well (102c) and a second sonicator (110b) and second injection apparatus (106b) are shown in a second horizontal branch of the multilateral well (102c).

The number of sonicators and injection apparatuses used may be determined, for example, on the target zone (104). If a target zone includes all branches of a multilateral well, then sonicators and injection apparatuses may, for example, be placed in all of the branches. If a target zone includes only certain branches of a multilateral well, then sonicators and injection apparatuses may, for example, be placed in a selection of the branches.

Figure 2:
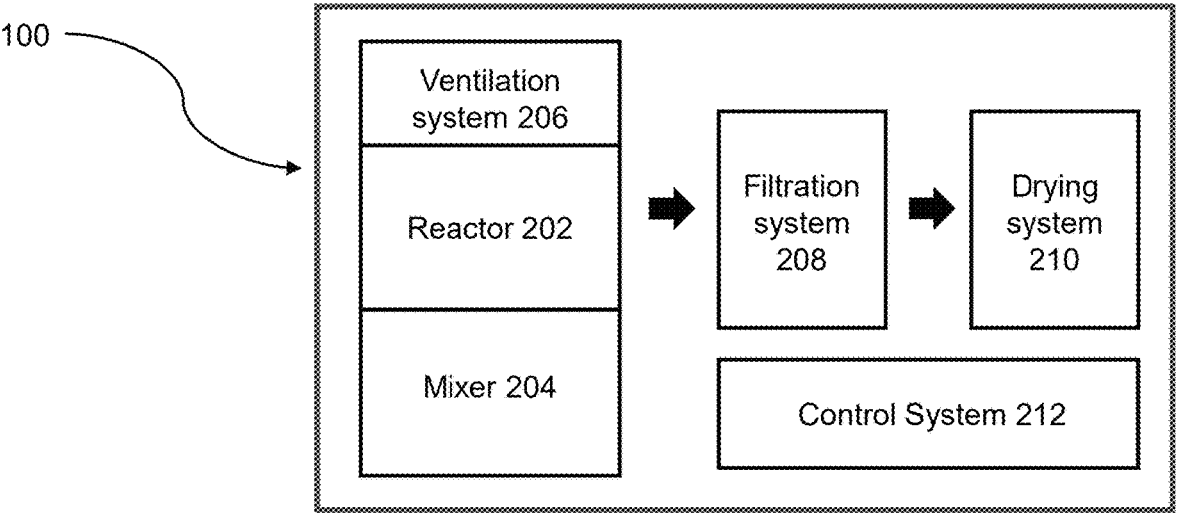
FIG. 2 is a schematic diagram of a silica generator according to one or more embodiments.

FIG. 2 shows an embodiment of the silica generator (100). The silica in accordance with one or more embodiments of the present disclosure has particular properties that make it useful for generating hydrogen downhole. For example, the silica may have a particle size ranging from 50 to 200 nanometers and a surface area of 100 to 400 square meters per gram ($m^2/g$).

The silica generator (100) includes a reactor (202) which is equipped with a mixer (204), a ventilation system, (206), a filtration system (208), and a drying system (210). The reactor (202) may be any suitable reactor known in the art for making silica particles. In one or more embodiments, the reactor (202) facilitates a sol-gel reaction, maintaining the conditions (e.g., temperature and pH level) required for the reaction. The reactor (202) may be a controlled reaction vessel, mixing tank, etc. In one or more embodiments, oilfield equipment, such as mixing tanks and pumps, may be repurposed for the reactor (202).

The reactor (202) is shown coupled to a mixer (204), which is used to mix reactants in the reactor (202). The mixer (204) may, for example, be a high-shear mixer or ultrasonic agitation equipment. Mixing may be needed to properly homogenize the reactants in the reactor (202) and control particle sizes. The reactants for generating silica may include precursor materials such as silica precursors (e.g., tetraethyl orthosilicate, TEOS, or tetramethyl orthosilicate, TMOS), structure-directing agents, such as CTAB (cetrimonium bromide), catalysts (e.g., ammonia) and surface charge modifiers (e.g., functionalizing agents like amines, carboxylic acids, or quaternary ammonium compounds). A ventilation system (206) may also be coupled to the reactor (202) to handle volatile organic compounds (VOCs) released during the sol-gel process.

The filtration system (208) filters the product of the reaction. As is known by those skilled in the art, the product of a sol-gel reaction is a solid material (e.g., a gel containing silica particles) and a liquid. Thus, the filtration system (208) is configured to filter and retain the solid for further processing and remove the liquid for disposal. The filtration system (208) may include a filtration membrane, centrifuge, or other type of filtration system known in the art. The drying system (210) dries the generated silica after it has been filtered. The drying system (210) may, for example, dry the generated silica into a powder for storage or immediate use in an injection fluid. The drying system (210) may include an oven, vacuum chamber, membrane dryer, or other type of drying system known in the art.

A treatment process may be used to achieve a particular surface charge or functionality on the silica. The surface charge may be modified during a synthesis process, such as the sol-gel process, or through a post-treatment process, such as functionalizing the surface of each silica nanoparticle with the desired chemical groups (e.g., hydroxides, amines, or carboxylic acids). If the surface charge is added during the sol-gel process, functionalizing agents (e.g., silane coupling agents) may be added to the precursor solution in the reactor (202).

If the surface charge is added during a post-treatment process, additional equipment may be required, such as a functionalization reactor and a second filter. The functionalization reactor and the second filter may be included as part of the silica generator (100). Generated silica may, for example, be functionalized in the functionalization reactor after being dried. Functionalized generated silica may then, for example, be placed in the second filter to separate functionalized generated silica from the reaction medium.

The chemical groups selected for functionalization may impart a positive or negative charge to the silica. For instance, amine groups typically result in a positive surface charge, while carboxylic acids can create a negative charge. The choice of chemical groups depends on the desired interaction with the surrounding environment in the wellbore. Devices such as zeta potential analyzers and BET surface area analyzers may be used to test the surface charge and surface area of the silica.

The silica generator (100) may include additional components such as a control system (212). The control system (212) may monitor silica generation in the reactor (202) using sensors that measure, for example, temperature, pH, mixing speed, and reaction time. The control system (212) may adjust conditions in the reactor (202), such as the temperature, pH, mixing speed, and reaction time, using a processor in electronic communication with the reactor (202).

In one or more embodiments, the processor in the control system (212) may be configured to automate one or more processes in the silica generator (100). By adding automation within the silica generator (100), using, for example, programmable logic controllers (PLCs) and/or robotic systems, silica may be generated with little to no human intervention.

A small on-site facility may be required to house the silica generator (100), particularly if it is not fully automated. The facility may be climate-controlled to maintain precise reaction conditions.

Various properties of the silica may be measured for quality control. These properties may include pore size, pore distribution, thermal stability, etc. In one or more embodiments, a pore size may be selected to promote silica reactivity and fluid flow. For example, a pore size of 2-10 nanometer (nm) may be selected. A uniform pore distribution may be chosen to maintain consistent reactivity across the silica particles. It may also be advantageous to select silica that can withstand high-temperature wellbore conditions, e.g., temperatures up to 800° C. Measurement techniques include mercury porosimetry and thermogravimetric analysis.

A material that is denser than silica may be attached to silica and used as a weighting agent to facilitate the movement of silica down in the well. The attachment may be performed using a chemical or mechanical process at a wellbore site. A chemical process may include reacting the silica with silane coupling agents to bond weighting agents to the silica surface. A mechanical process may include mechanically agitating or milling a mixture of silica and weighting agents For example, a silica generator (100) may be configured to attach silica to a weighting agent. The attachment process may be optimized by limiting the amount of the weighting agent, thereby preventing the weighting decreasing the acoustic responsiveness of the silica.

In one or more embodiments, high-density barium sulfate, a material used in other oil and gas applications such as drilling and completion fluids, may be used as a weighting agent. Because barium sulfate dissolves under reservoir conditions, it may not remain attached to silica during the entire process of hydrogen generation. In a deep wellbore, for example, barium sulfate may be used to assist silica in reaching the bottom of the wellbore. Sonication of the silica may be delayed until the barium sulfate dissolves, which usually occurs within one to two days. Alternatively, sonication may be performed before the barium sulfate dissolves, stimulating hydrogen generation sooner.

Hematite, manganese tetraoxide, or silica sands are other examples of materials denser than silica which may be used. Hematite may be selected as a weighting agent, for example, for its high density, compared to silica, and its stability Silica may, additionally or alternatively, be encapsulated within a shell. Possible combinations of weighting agents and shells may be limited based on the material properties of each individual material. For example, barium sulfate may not be compatible with certain shell materials due to its solubility.

A shell may be formed around silica using a technique such as sol-gel processing, layer-by-layer deposition, spray drying, or a solvent-based encapsulation process as known by those skilled in the art. For example, a silica generator (100) may be configured to form a shell around silica at a wellbore site using a coating reactor, precursor material, and curing system.

A shell may be used to delay exposure of the surface of the silica to the surrounding environment until the charged silica is in the target zone 104. In such embodiments, hydrogen generation can be more specifically targeted to a particular zone. A shell may also be used to protect silica from the surrounding environment, such as an environment which may damage the silica.

Calcium carbonate, calcium sulfate, biodegradable or synthetic polymers, clay minerals, or magnesium oxide, among other materials, may be used as shells depending on the desired shell properties. For example, shell degradation, mechanical strength, thermal stability, and chemical resistance may be considered when selecting a shell. In one or more embodiments, it may be desirable that shells withstand wellbore pressures and/or temperatures, e.g., possess mechanical strength in a range of 1000 to 5000 psi, possess thermal stability at temperatures up to 300° C., etc. It may also, for example, be desirable for shells to be chemically resistant to common wellbore fluids, such as brines and hydrocarbons.

Calcium carbonate shells, for example, may be used in wellbores with water saturation. Calcium carbonate dissolves in water with a pH shift. Calcium carbonate shells can dissolve in alkaline or acidic environments, though they may dissolve more quickly in acidic environments. Since formation water tends to be acidic, calcium carbonate shells may be desirable when silica needs to be protected from the environment as it travels into a wellbore then react quickly once it is in the wellbore.

Magnesium oxide shells, for example, may also be used in wellbores with water saturation. Magnesium oxide dissolves at pH values lower than 7, ensuring that it would release silica only in water-rich zones within a wellbore. When magnesium oxide dissolves in water, it forms magnesium hydroxide. As a result, dissolved magnesium oxide may release hydrogen which increases pressure in the surrounding fluid, potentially contributing to artificial lift.

Targeted hydrogen generation may also be achieved using a matrix, such as a dissolvable silica-alumina matrix, injected with silica. For this type of silica injection fluid, silica is mixed with a matrix and the mixture is combined with water.

A silica generator (100) may, for example, be configured to mix silica and a matrix at a wellbore site. In one or more embodiments, silica and a matrix material may be combined at a ratio of 1:1 by weight. By mixing together silica and the matrix material, the silica becomes distributed within the matrix. The silica may stay within the matrix until the matrix material degrades or fractures.

When a silica-alumina matrix is used, the silica may be released when the matrix dissolves. Alternatively, the silica can be released by fracturing the silica-alumina matrix with sonication in the 50-100 Hz frequency range. If a silica-alumina matrix with silica is used in a well, sonication could be performed to initiate hydrogen generation, with both spatial and temporal control tunable through sonication and the solubility of the matrix.

In one or more embodiments, it may be desirable that matrix materials withstand wellbore pressures and/or temperatures, e.g., possess mechanical strength in a range of 1000 to 5000 psi, possess thermal stability at temperatures up to 300° C., etc. It may also, for example, be desirable for matrix materials to be chemically resistant to common wellbore fluids, such as brines and hydrocarbons.

Alternatively, silica may be encapsulated with wax. Encapsulation may be performed through a process such as spray drying or fluidized bed coating, resulting in each silica particle being coated with a layer of wax. A silica generator (100) may, for example, be configured to encapsulate charged silica in wax. As the wax bead melts, it may release the encapsulated silica. The melting time may be tuned by adjusting the bead diameter, with a larger diameter associated with a longer melting time.

A specific type of wax may be selected for its melting temperature. For example, paraffin melts at 120° C. A paraffin-coated dissolvable bead may melt in a wellbore with heavy oil and/or tar, releasing any silica inside. Additionally, the melted wax may reduce the viscosity of the heavy oil and/or tar, improving the flow efficiency.

The silica may be introduced downhole in an injection fluid. By mixing silica with an injection fluid, the silica particles may be less likely to agglomerate, resulting in a more even distribution of silica during injection. The injection fluid may, for example, be alkaline water. The pH of alkaline water may be selected to increase the reactivity of the silica within a wellbore.

For wells with water blockages, a silica concentration in the injection fluid of 5-10 pounds per barrel (lb/bbl) may be used. For wells with gas blockages, a silica concentration in the injection fluid of 10-15 lb/bbl may be used. For wells with heavy oil, a silica concentration in the injection fluid of 20-30 lb/bbl may be used. A person of skill in the art will readily appreciate that the optimal concentration will vary greatly depending on the environment and other parameters of the well.

Figure 3A:
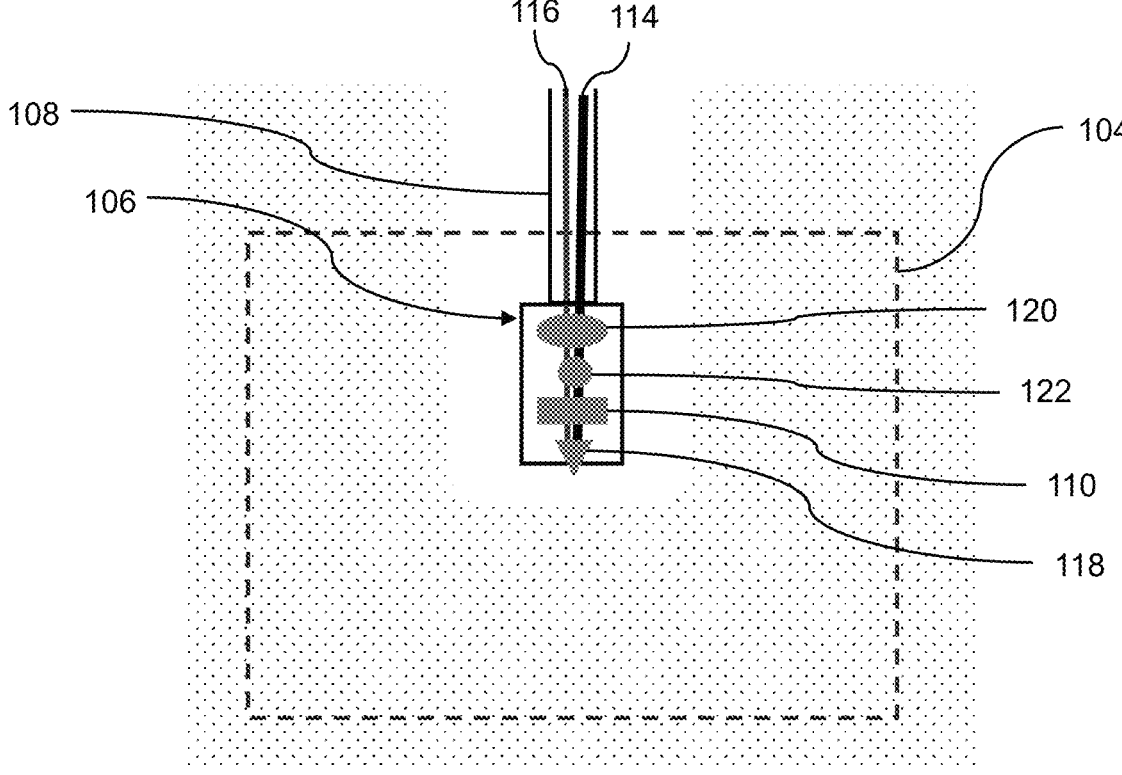
FIGS. 3A-3B are schematic diagrams of an injection apparatus according to one or more embodiments.
Figure 3B:
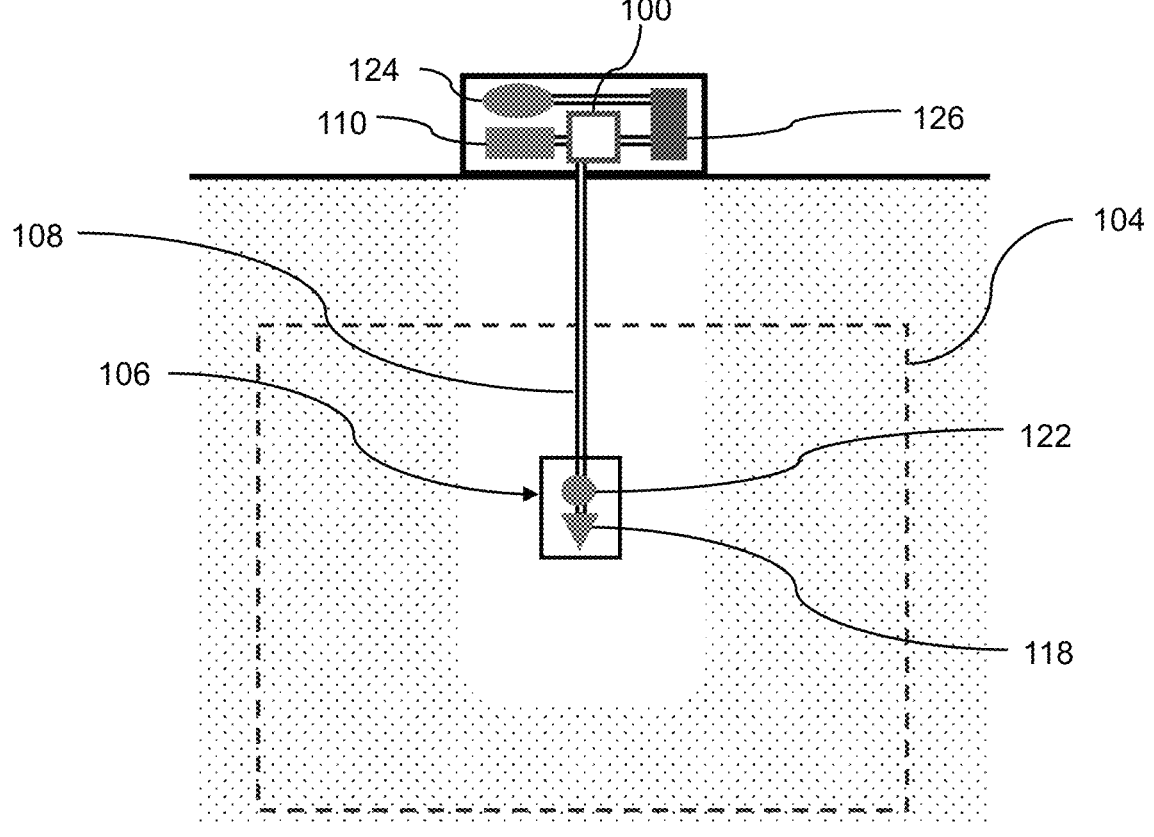

Embodiments of the injection apparatus (106) are shown in FIGS. 3A and 3B. The conduit (108) may be considered an extension of the injection apparatus (106) in one or more embodiments. As shown in FIG. 3A, the conduit (108) may include tubing (114) and a wireline (116). The tubing (114) may be used to fluidly connect the silica generator (100) to the well. The tubing (114) may be coiled tubing, capillary tubing a fluid compression system, or an apparatus specifically designed for the present disclosure by taking various factors into consideration, such as well design and production requirements. The tubing diameter, length, material, pressure rating, and temperature rating may be selected for compatibility with the injection fluid and durability in wellbore conditions. An opening (118) at the end of the tubing in the well may be used for injecting a fluid into the bottom of the hole. In one or more embodiments, the injection fluid must be injected at a high enough pressure to overcome the wellbore formation pressure.

In one or more embodiments, the injection apparatus (106) may include an in-line sensor (120) located in the target zone (104) of the well. The in-line sensor (120) may be placed in the well by attaching it to the injection apparatus (106) or another piece of equipment, such as a packer or perforating gun. The in-line sensor (120) may be electronically connected to a wireline (116) which may be used to lower the in-line sensor (120) into the well and transmit signals between the in-line sensor (120) and other equipment. For example, an in-line sensor (120) may connect to a data acquisition system and power source. The sensor measurements may be used to control other equipment, such as the injector or sonicator. The in-line sensor (120) may be configured to measure the concentration of hydrogen in the well and communicate with a controller outside the well.

The in-line sensor (120) may be any sensor available in the art, provided that the sensor is designed to withstand the operating temperature and pressure. The in-line sensor (120) may include a pressure sensor, temperature sensor, or flow rate sensor, either individually or in combination. The in-line sensor may be used, for example, to inform sonication parameters. In one or more embodiments, to maintain silica suspension in the wellbore, the amplitude of the sound waves may be increased if the flow rate decreases. In another embodiment, to increase interactions between silica and water, the frequency of the sound waves may be adjusted as the temperature changes.

The injection apparatus (106) may further include a pressure gauge (122), such as a quartz crystal or piezoelectric pressure gauge. The pressure gauge (122) may be located downhole, for example, near the sonicator (110) or injection opening (118). The pressure gauge (122) may be configured to measure BHP and communicate with a controller outside the well. During a hydrogen generation reaction, changes in pressure measurement may provide an indication of the progress of the reaction. For example, an increase in pressure may indicate an increase in hydrogen generation and a decrease in pressure may indicate a decrease in hydrogen generation.

The sonicator (110) is depicted in FIG. 3A located in the well, for example, as part of the injection apparatus (106). The sonicator (110) connected to another piece of equipment, such as a packer or perforating gun, or integrated into a completion tool, such as an ICD (Inflow Control Device) or ICV (Inflow Control Valve). The sonicator (110) may be lowered into the well using tubing (114) or a wireline (116).

Turning to FIG. 3B, the sonicator (110) is depicted above the surface of the well, separate from the injection apparatus (106). A controller (126) is also depicted in communication with the sonicator (110), silica generator (100), pressure gauge (122), and opening (118).

Additionally, a surface sensor (124) is shown connected to the controller (126) via the conduit (108). In one or more embodiments, the surface sensor (124) may be located in the oil production facility (112) and may be used to monitor hydrogen concentration in fluids produced from the well.

Figure 4A:
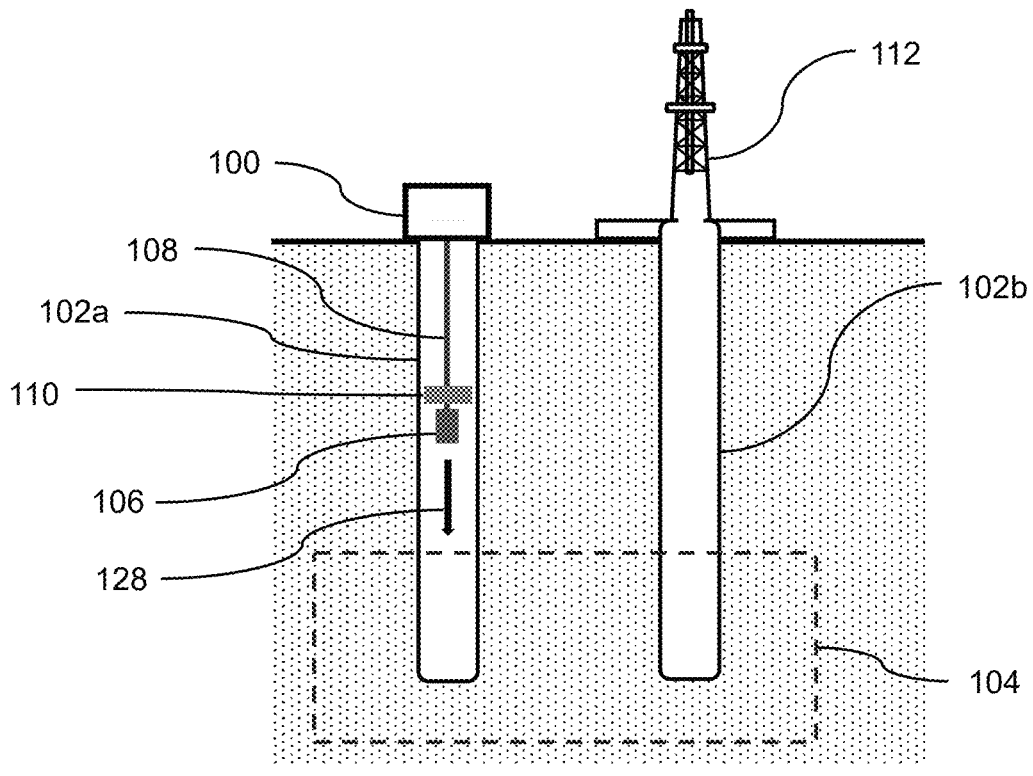
FIGS. 4A-4E are schematic diagrams of a method for using a system for artificial lift according to one or more embodiments.
Figure 4B:
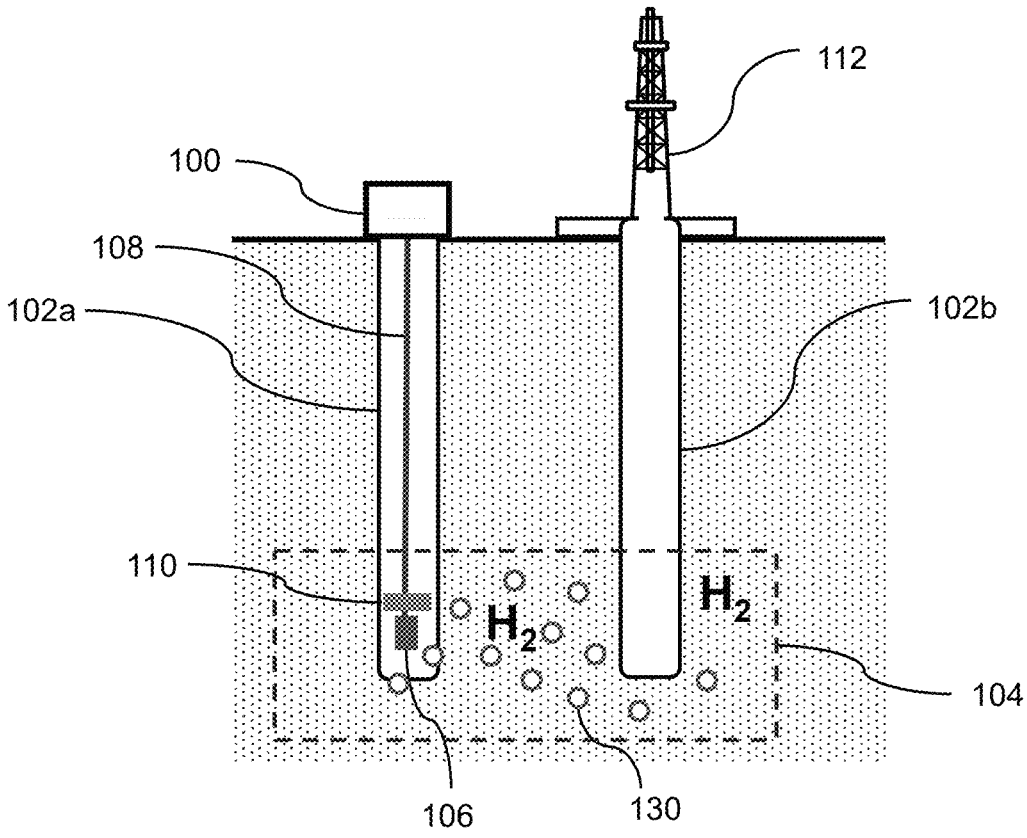

An example of a process for using a system to generate hydrogen in a well is shown in FIGS. 4A-4E. In FIG. 4A, a silica generator (100) is connected to a sonicator (110) and an injection apparatus (106) via a conduit (108). The sonicator (110) and injection apparatus (106) are lowered into the target zone (104) of an injection well (102a), as depicted with an arrow (128). In FIG. 4B, the injection apparatus (106) is shown to inject an injection fluid (130) into the target zone (104). The injection fluid is shown moving toward a production well (102b). Hydrogen generation begins as the silica interacts with water.

Figure 4C:
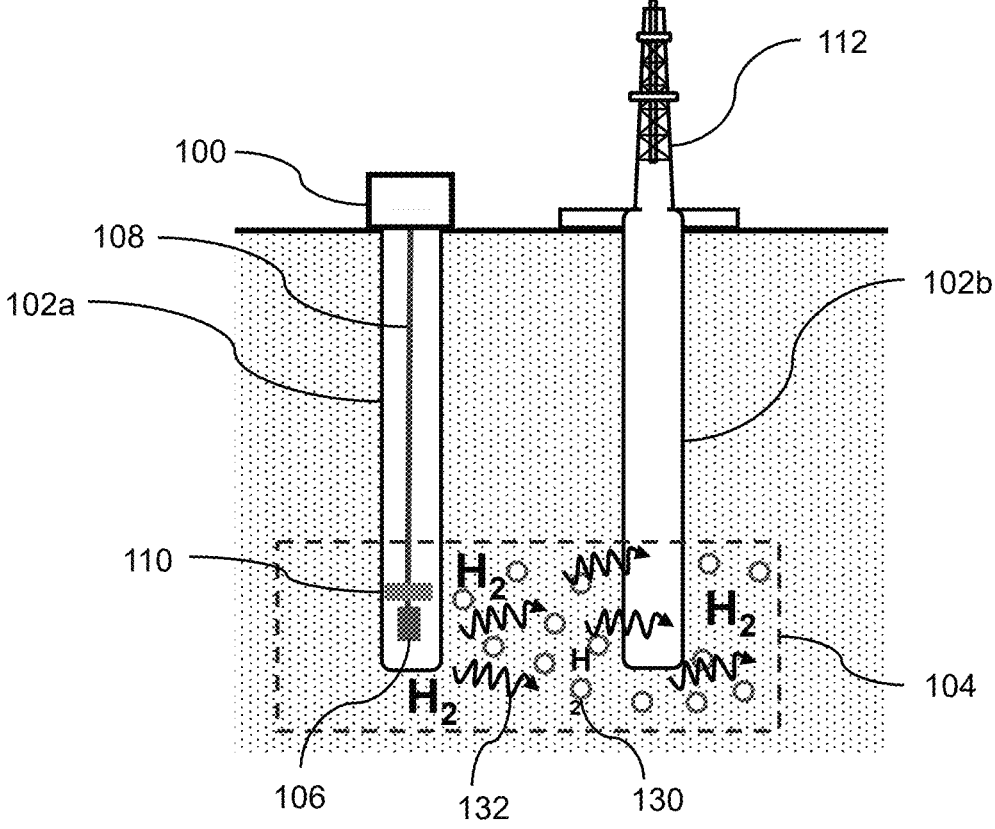

In FIG. 4C, the sonicator (110) is shown sending sound waves (132) into the target zone (104). The sound waves are shown to increase the hydrogen generated in the well. The sound waves (132) may be infrasonic, audible, ultrasonic, or a combination thereby. The sound waves (132) may be introduced before, during and/or after injection of the injection fluid (130). The sound waves (132) may be introduced continuously or intermittently. The introduction of sound waves (132) may be determined based on the reservoir conditions (e.g., temperature, pressure, and fluid composition), and/or based on reservoir simulation studies. In one or more embodiments, the sound waves (132) are introduced when there is a need to increase the reaction rate of silica with water and/or increase the gas flow rate through the production well/reservoir. Sonication enhances the reaction by causing more collisions between the silica and water. Sonication may also enhance the reaction by causing cavitation bubbles that break up the silica particles, increasing the surface area of the silica particles.

The strength of the sound waves and duration of sound waves introduction may be determined based on the requirements of each operation, and various factors such as conditions of the wellbore/reservoir, types of hydrocarbons and specific method used for hydrogen generation. For example, acoustic frequencies from 20-30 kHz may be effective at generating large cavitation bubbles which improve fluid mobilization. For greater energy efficiency, frequencies from 25-35 kHz may be chosen which enhance the reaction by causing cavitation bubbles. In wells with heavy oil and tar, 30-40 kHz may be beneficial to improve micro-emulsion formation.

Turning to acoustic intensity, 50-100 watts per square centimeter are generally effective for artificial lift and enhanced oil recovery applications. When silica needs to be conserved, intensities from 50-80 watts per square centimeter may be chosen. In high-salinity environments, 75-100 watts per square centimeter may be needed to ensure silica activation. High intensities, from 80-100 watts per square centimeter, may also be needed to ensure silica activation at high temperatures. Finally, sonication may be desirable for 30-60 minutes, with shorter durations used for high-permeability zones and longer durations used for viscous oil, water-saturated zones, etc. Sonication may be conducted at any combination of the frequencies, intensities, and durations described above, or at any other combination of frequencies, intensities, and durations as known by those of skill in the art.

In one or more embodiments, the pressure measured in the well may be used to determine whether to activate or deactivate the sonicator (110). An activation threshold may be defined as the pressure required to activate the sonicator (110). Pressures lower than or equal to the activation threshold may indicate that hydrogen generation may not be sufficient to cause oil and/or gas mobility, and, therefore, it may not be beneficial to begin sonication. A deactivation threshold may be defined as the pressure required to deactivate the sonicator (110). Pressure lower than or equal to the deactivation threshold may indicate that the hydrogen generation reaction has slowed and sonication is no longer useful. For example, 500 psi may be selected as an activation threshold and 200 may be selected as a deactivation threshold.

Figure 4D:
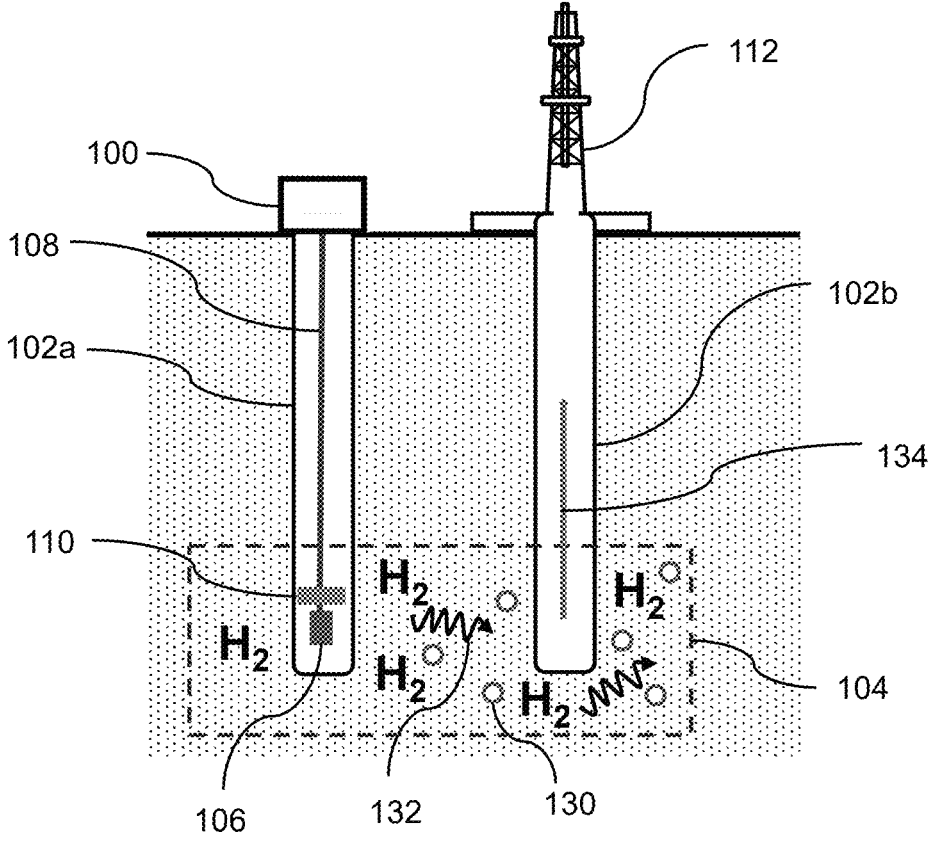
Figure 4E:
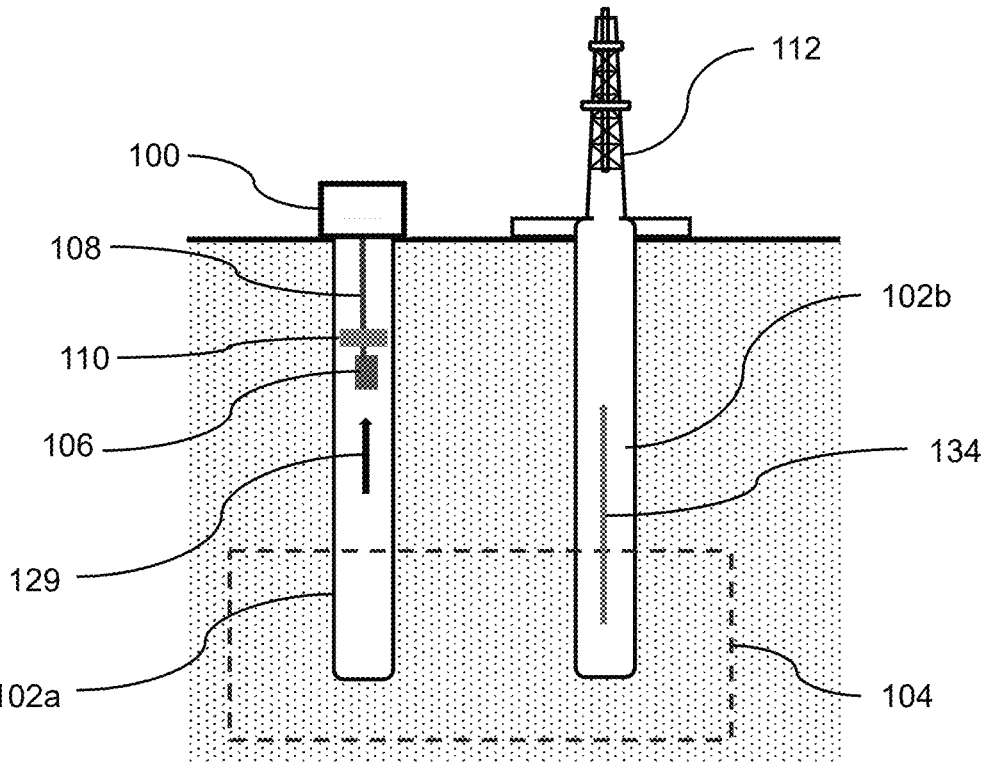

In FIG. 4C, the sound waves (132) are shown passing through the injection fluid (130). Silica in the injection fluid reacts with water, generating hydrogen, as shown in FIG. 4D. The hydrogen mobilizes hydrocarbons (134) upwards within the production well (102b). The hydrocarbons (134) may then be harvested by the oil production facility (112), i.e., the oil production facility may, in accordance with one or more embodiments, begin or continue recovering hydrocarbons (134). After a sufficient amount of hydrocarbon has been produced, e.g., when the production well is depleted, the sonicator (110) and injection apparatus (106) may be removed from the injection well (102a), as depicted with an arrow (129) in FIG. 4E. The silica generator (100) may be removed from the surface of the injection well (102a) and optionally disconnected from the sonicator (110) and injection apparatus (106).

Figure 5:
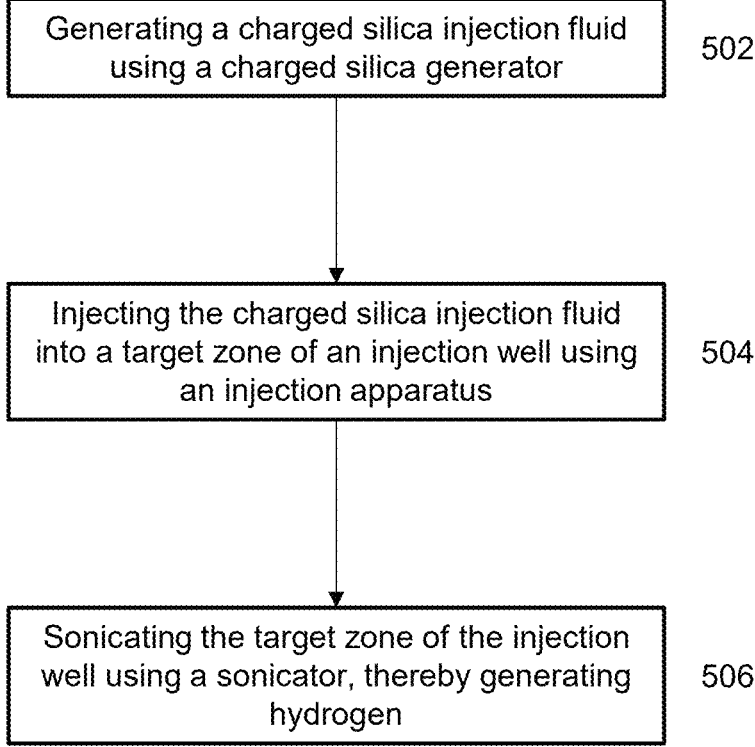
FIG. 5 is a flowchart in accordance with one or more embodiments.

FIG. 5 shows a flowchart in accordance with one or more embodiments. Specifically, FIG. 5 describes methods for artificial lift using a silica generator according to embodiments of the present disclosure. One or more blocks in FIG. 5 may be performed by one or more components. While the various blocks in FIG. 5 are presented and described sequentially, one of ordinary skill in the art will appreciate that some or all of the blocks may be executed in parallel or non-sequentially. Furthermore, the blocks may be performed actively or passively.

In Block 502, a silica generator is used to generate a silica injection fluid. In Block 504, the silica injection fluid is injected into a target zone of an injection well using an injection apparatus. The injection apparatus may include tubing fluidly connecting the silica generator and the injection well. The silica injection fluid may flow through the tubing and out of an opening into the injection well. The silica injection fluid may be injected directly into the target zone of the injection well, or it may be injected proximate to the target zone of the injection well. In Block 506, a sonicator is used to sonicate the target zone of the injection well, thereby generating hydrogen. The sonicator may be deployed in the injection well, or it may be located at the surface.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A system comprising:
a silica generator configured to generate an injection fluid comprising silica particles;
an injection apparatus in fluid communication with the silica generator and configured to inject the silica injection fluid into a target zone of an injection well, wherein the injection apparatus further comprises a pressure gauge configured to measure a pressure within the target zone of the injection well; and
a sonicator configured to transmit sound waves to the target zone of the injection well,
wherein the sonicator is configured to activate when the pressure measurement is greater than or equal to an activation threshold, and
wherein the sonication is configured to deactivate when the pressure measurement is less than or equal to a deactivation threshold.

2. The system of claim 1, wherein the sonicator comprises at least one selected from the group consisting of an acoustic wave generator, an ultrasonic wave generator, and an infrasonic wave generator.

3. The system of claim 1, further comprising a controller configured to control the injection apparatus and sonicator.

4. The system of claim 3, wherein the injection apparatus further comprises an in-line sensor configured to measure a concentration of hydrogen within the target zone of the injection well.

5. The system of claim 3, further comprising a surface sensor configured to measure a concentration of hydrogen in hydrocarbons harvested from a production well.

6. The system of claim 1, wherein the silica injection fluid further comprises alkaline water.

7. The system of claim 1, wherein a concentration of silica in the silica injection fluid is from 5 lb/bbl to 30 lb/bbl.

8. The system of claim 1, wherein the silica in the silica injection fluid comprises a surface functionalization.

9. The system of claim 1, wherein the silica particles comprise a shell encapsulating the silica particles.

10. The system of claim 1, wherein the injection fluid further comprises a matrix mixed with the silica.

11. A method comprising:
generating an injection fluid comprising silica particles;
injecting the injection fluid into a target zone of an injection well;
measuring a pressure in the target zone of the injection well using a pressure gauge; and
sonicating the target zone of the injection well, thereby generating hydrogen,
wherein sonication is activated when the pressure measurement is greater than or equal to an activation threshold, and
wherein sonication is deactivated when the pressure measurement is less than or equal to a deactivation threshold.

12. The method of claim 11, further comprising recovering hydrocarbons from a production well.

13. The method of claim 11, further comprising monitoring the generation of hydrogen in the target zone of the injection well using an in-line sensor.

14. The method of claim 11, wherein the sonicating of the target zone of the injection well is conducted at a frequency of from 20 kHz to 40 kHz.

15. The method of claim 11, wherein the sonicating of the target zone of the injection well is conducted at an intensity of from 50 watts per square centimeter to 100 watts per square centimeter.

16. The method of claim 11, wherein the sonicating of the target zone of the injection well is conducted for a duration of from 30 minutes to 60 minutes.

* * * * *